US012085231B2

(12) United States Patent
Fujii

(10) Patent No.: US 12,085,231 B2
(45) **Date of Patent: *Sep. 10, 2024**

(54) TANK HOLDING DEVICE

(71) Applicant: TOYOTA JIDOSHA KABUSHIKI KAISHA, Toyota (JP)

(72) Inventor: Manabu Fujii, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 17 days.

This patent is subject to a terminal disclaimer.

(21) Appl. No.: 17/662,562

(22) Filed: May 9, 2022

(65) Prior Publication Data

US 2023/0003348 A1 Jan. 5, 2023

(30) Foreign Application Priority Data

Jun. 30, 2021 (JP) ................................ 2021-108290

(51) Int. Cl.
*F17C 13/08* (2006.01)

(52) U.S. Cl.
CPC .... *F17C 13/084* (2013.01); *F17C 2201/0109* (2013.01); *F17C 2205/0196* (2013.01); *F17C 2221/012* (2013.01); *F17C 2270/0168* (2013.01); *F17C 2270/0184* (2013.01)

(58) Field of Classification Search
CPC ............ F17C 13/084; F17C 2201/0109; F17C 2221/012
USPC ........................................................ 248/313
See application file for complete search history.

(56) References Cited

U.S. PATENT DOCUMENTS

| | | | |
|---|---|---|---|
| 1,607,943 | A | 11/1926 | James et al. |
| 2,426,423 | A | 8/1947 | Woolsey |
| 3,315,626 | A | 4/1967 | Gorman et al. |
| 4,155,529 | A | 5/1979 | Maudlin |
| 4,185,858 | A | 1/1980 | Peash |
| 4,219,125 | A | 8/1980 | Wiltshire et al. |
| 4,676,473 | A | 6/1987 | Giles |
| 4,886,241 | A | 12/1989 | Davis et al. |

(Continued)

FOREIGN PATENT DOCUMENTS

| | | | |
|---|---|---|---|
| JP | 2016070467 | A | 5/2016 |
| JP | 2021195964 | A | 12/2021 |

OTHER PUBLICATIONS

Office Action issued to U.S. Appl. No. 17/808,618 on Nov. 24, 2023.

(Continued)

*Primary Examiner* — Todd M Epps
(74) *Attorney, Agent, or Firm* — Hunton Andrews Kurth LLP

(57) ABSTRACT

A tank holding device includes a band configured to tighten a hydrogen tank. The band includes a band-shaped base portion extending along an outer circumference of the hydrogen tank, a plurality of pressing portions projecting from both sides of the base portion in a width direction orthogonal to a longitudinal direction of the base portion and configured to apply a pressing force to an outer peripheral surface of the hydrogen tank by elastically deforming in abutment against the outer peripheral surface of the hydrogen tank, and a deformation limiting portion configured to limit deformation of the pressing portions to a specified amount.

11 Claims, 12 Drawing Sheets

(56) References Cited

U.S. PATENT DOCUMENTS

| | | | | |
|---|---|---|---|---|
| 5,411,162 | A | 5/1995 | Koziczkowski et al. | |
| 5,470,207 | A | 11/1995 | Shockey et al. | |
| 5,810,309 | A | 9/1998 | Augustine et al. | |
| 5,848,776 | A | 12/1998 | Craig et al. | |
| 5,979,227 | A | 11/1999 | Lawson et al. | |
| 6,042,071 | A | 3/2000 | Watanabe et al. | |
| 6,557,814 | B1 | 5/2003 | Rutz | |
| 6,840,556 | B1 * | 1/2005 | Catlett | B65G 7/12 294/16 |
| 6,877,780 | B2 | 4/2005 | Potts et al. | |
| 7,520,539 | B2 | 4/2009 | Ignaczak et al. | |
| 8,356,786 | B2 | 1/2013 | Guckes | |
| 9,618,147 | B2 | 4/2017 | Krueger | |
| 10,180,267 | B2 | 1/2019 | Bober | |
| 10,429,097 | B1 | 10/2019 | Sexton | |
| 2009/0309000 | A1 * | 12/2009 | Guckes | B60K 15/07 248/309.1 |
| 2011/0272941 | A1 | 11/2011 | Broderick et al. | |
| 2016/0039282 | A1 * | 2/2016 | Mathew | B60K 15/067 248/313 |
| 2016/0097487 | A1 | 4/2016 | Sasaki | |
| 2018/0326842 | A1 * | 11/2018 | Sawada | B60K 15/07 |
| 2021/0388948 | A1 * | 12/2021 | Fujii | B60N 3/106 |
| 2023/0003342 | A1 * | 1/2023 | Fujii | F17C 13/084 |

OTHER PUBLICATIONS

Notice of Allowance issued to U.S. Appl. No. 17/808,618 on Apr. 17, 2024, 14 pages.

* cited by examiner

TANK HOLDING DEVICE

CROSS-REFERENCE TO RELATED APPLICATION

This application claims priority to Japanese Patent Application No. 2021-108290 filed on Jun. 30, 2021, incorporated herein by reference in its entirety.

BACKGROUND

1. Technical Field

The present disclosure relates to a tank holding device.

2. Description of Related Art

For example, there is known a tank holding device described in Japanese Unexamined Patent Application Publication No. 2016-070467 (JP 2016-070467 A). In this tank holding device, a tank is placed in a support member having a recess for storing the tank, and is held by tightening the tank with bands from a side opposite to the support member for the tank. In this tank holding device, one end of the band is fixed to the support member with a bolt. The other end of the band is fixed to the support member while being urged by a coil spring. The band receives an urging force of the coil spring and is pressed against the outer peripheral surface of the tank.

SUMMARY

Recently, studies have been conducted to hold a tank by using a band having a leaf spring structure instead of the coil spring in order to reduce the size of the tank holding device. When a large stress is applied to the band having the leaf spring structure, however, the leaf spring may be stroked excessively and deformed irreversibly.

The present disclosure provides a tank holding device capable of preventing irreversible deformation of a band.

A tank holding device according to one aspect of the present disclosure includes a band configured to tighten a tank. The band includes a band-shaped base portion extending along an outer circumference of the tank, a plurality of pressing portions projecting from both sides of the base portion in a width direction orthogonal to a longitudinal direction of the base portion and configured to apply a pressing force to an outer peripheral surface of the tank by elastically deforming in abutment against the outer peripheral surface of the tank, and a deformation limiting portion configured to limit deformation of the pressing portions to a specified amount.

In the tank holding device according to the one aspect of the present disclosure, the band includes the deformation limiting portion configured to limit the deformation of the pressing portions to the specified amount. Even if a large stress is applied to the band due to vibration, impact, or the like, the deformation limiting portion limits the deformation of the pressing portions to the specified amount. Thus, it is possible to prevent irreversible deformation of the band.

In the tank holding device according to the one aspect of the present disclosure, the deformation limiting portion may be provided on the base portion, and a length of the deformation limiting portion in a direction from the base portion toward the outer peripheral surface of the tank may be set to limit the deformation of the pressing portions to the specified amount by abutment of the deformation limiting portion against the outer peripheral surface of the tank.

In the tank holding device according to the one aspect of the present disclosure, the specified amount may be set to use the pressing portions in an elastic region. Thus, it is possible to reliably prevent the irreversible deformation of the band.

In the tank holding device according to the one aspect of the present disclosure, the pressing portion may include a tip portion at a distal end in a direction in which the pressing portion projects from the base portion, and a part of the tip portion may include a tab parallel to the outer peripheral surface of the tank.

In the tank holding device according to the one aspect of the present disclosure, the deformation limiting portion may be a part of the band that projects toward the tank. Thus, the deformation limiting portion can be formed by using a part of the band without increasing the number of components. As a result, it is possible to suppress an increase in cost along with the formation of the deformation limiting portion.

In the tank holding device according to the one aspect of the present disclosure, the deformation limiting portion may include a cut-up piece that is a part of the base portion bent toward the tank.

In the tank holding device according to the one aspect of the present disclosure, the deformation limiting portion may include a projecting piece projecting toward the tank from an end of the base portion in the width direction, and the projecting piece may be arranged between the pressing portions adjacent to each other in the longitudinal direction of the base portion.

In the tank holding device according to the one aspect of the present disclosure, the deformation limiting portion may include a dome-shaped raised portion in which a surface of the base portion facing the tank projects toward the tank.

In the tank holding device according to the one aspect of the present disclosure, the deformation limiting portion may be a stopper member attached to the base portion. Thus, the deformation limiting portion can easily be formed without processing the band.

In the tank holding device according to the one aspect of the present disclosure, the stopper member may have a block shape and may be fixed to a surface of the base portion facing the tank.

In the tank holding device according to the one aspect of the present disclosure, the stopper member may be elongated to extend along the longitudinal direction of the base portion and may be fixed to a surface of the base portion facing the tank.

According to the tank holding device of the one aspect of the present disclosure, the irreversible deformation of the band can be prevented.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
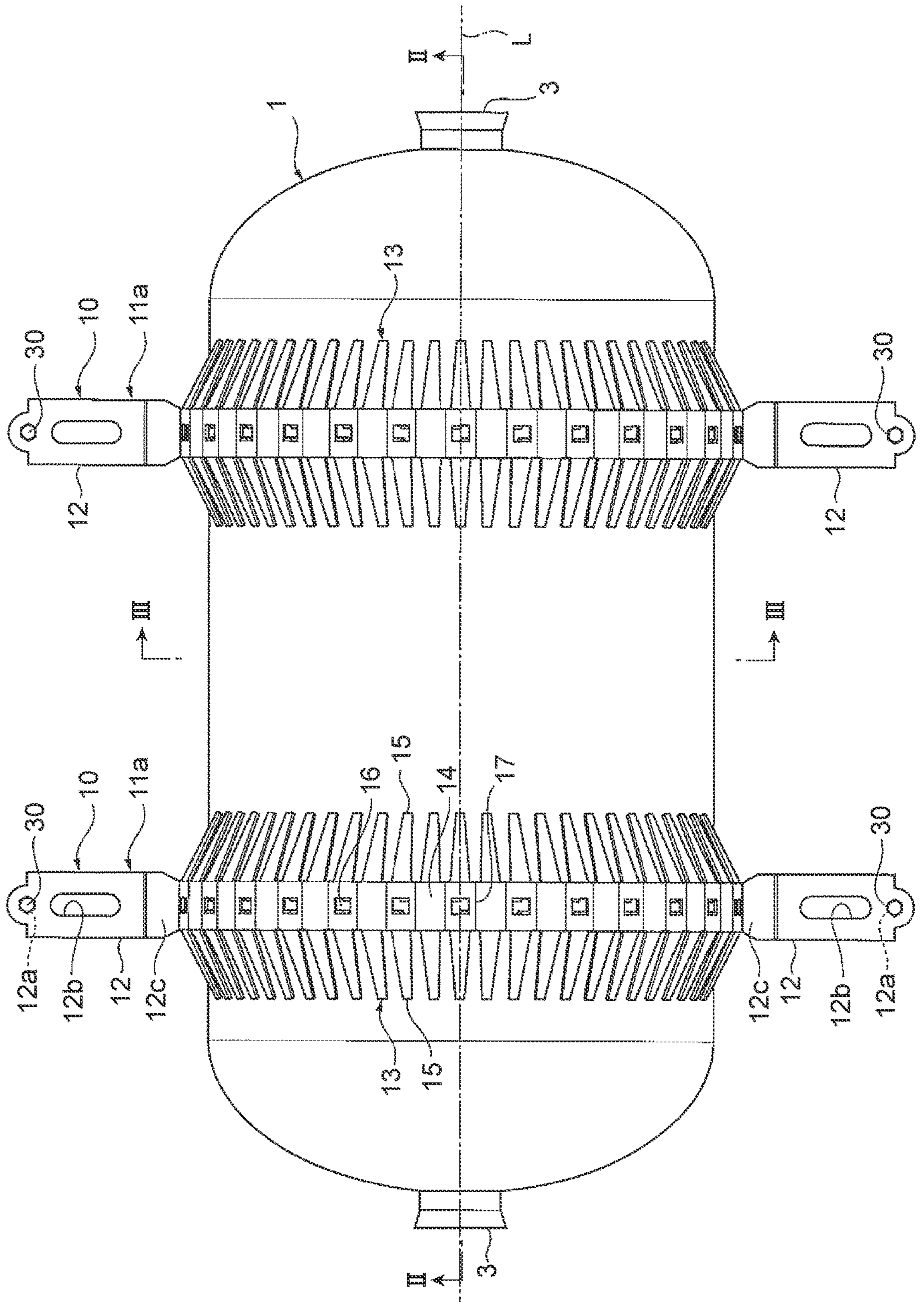
FIG. 1 is a plan showing a tank holding device according to an embodiment.

Hereinafter, a tank holding device according to an embodiment of the present disclosure will be described with reference to the drawings. In the description of the drawings, the same elements are represented by the same reference symbols, and duplicate description thereof will be omitted. In the following description, vertical and lateral directions are convenient directions related to, for example, a state shown in the drawings, and are not intended to limit the posture and arrangement of the tank holding device.

Figure 2:
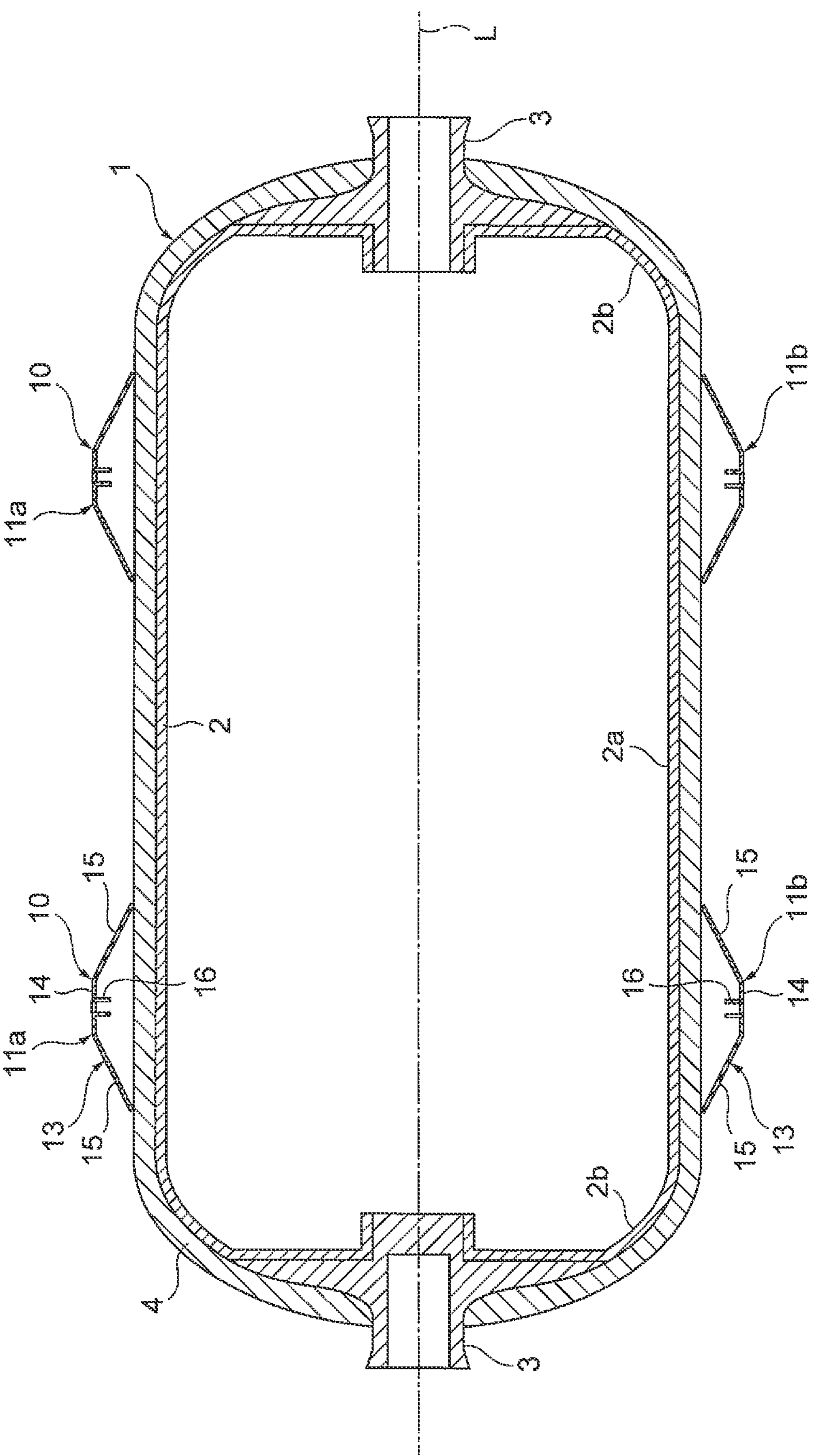
FIG. 2 is a sectional view taken along a line II-II in FIG. 1.
Figure 3:
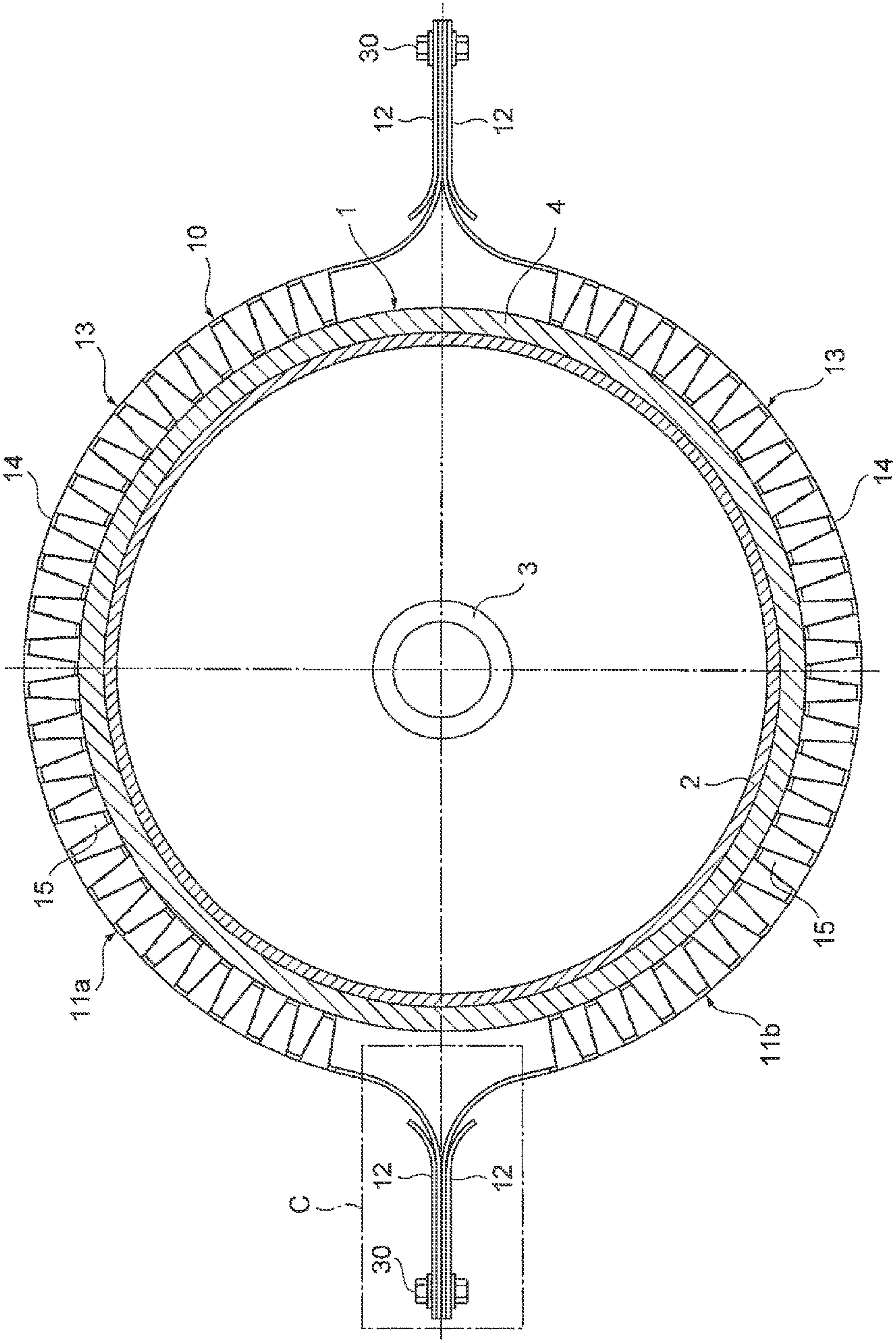
FIG. 3 is a sectional view taken along a line III-III in FIG. 1.
Figure 4:
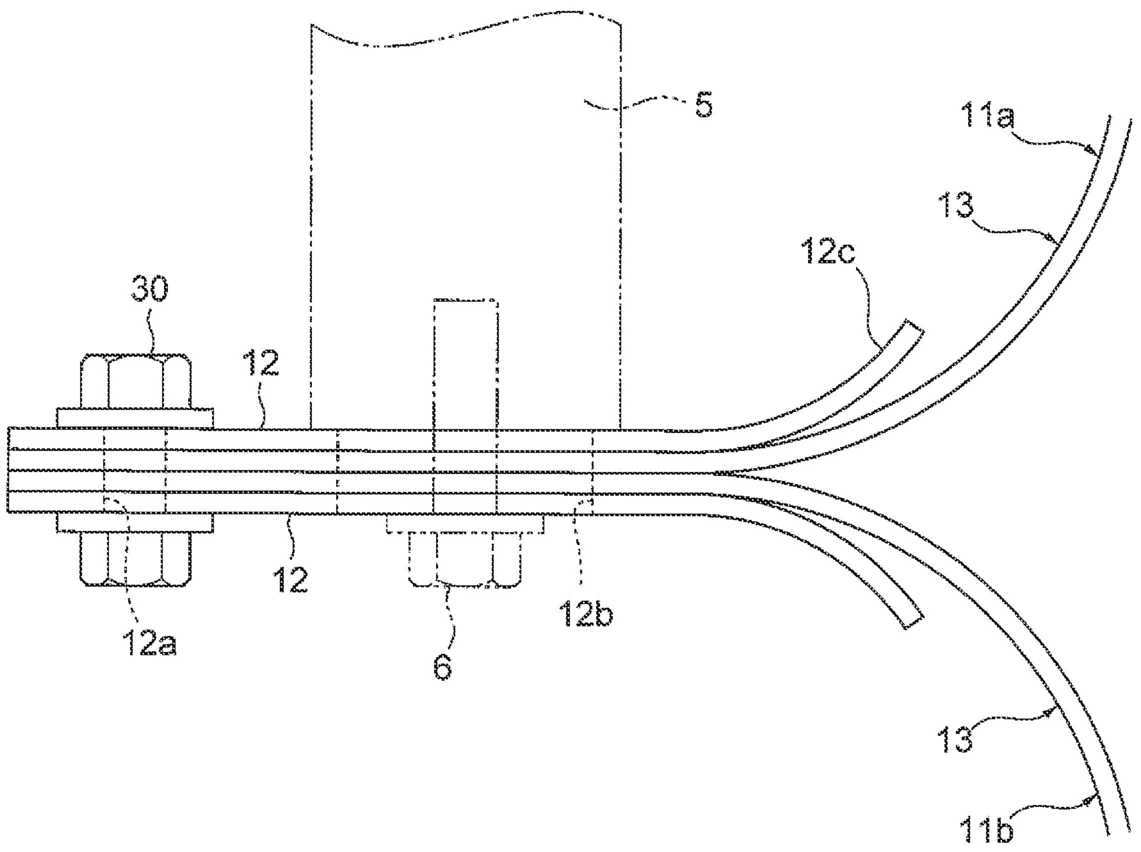
FIG. 4 is an enlarged view showing a portion C in FIG. 3.

FIG. 1 is a plan showing the tank holding device according to the embodiment. FIG. 2 is a sectional view taken along a line II-II in FIG. 1. FIG. 3 is a sectional view taken along a line III-III in FIG. 1. FIG. 4 is an enlarged view showing a portion C in FIG. 3. In FIGS. 1 to 3, a tank held by the tank holding device is also shown to facilitate understanding of the structure of the tank holding device. A tank holding device 10 of the present embodiment is a device for holding, for example, a hydrogen tank 1 mounted on a fuel cell electric vehicle (not shown) and fixing the hydrogen tank 1 to the body of the fuel cell electric vehicle. Prior to description of the tank holding device 10, the structure of the hydrogen tank 1 will briefly be described.

Hydrogen Tank

As shown in FIG. 2, the hydrogen tank 1 is a substantially cylindrical container with both ends rounded in a dome shape. The hydrogen tank 1 includes a liner 2 having a storage space for storing high-pressure hydrogen, and a reinforcing layer 4 provided in close contact with the outer peripheral surface of the liner 2. The liner 2 includes a cylindrical body 2*a* and substantially hemispherical domes 2*b* provided at both right and left ends of the body 2*a*. Openings are formed at the top of the two domes 2*b*, and metal caps 3 are internally inserted into these openings.

The liner 2 is made of, for example, a resin material having a gas barrier property against hydrogen gas. Examples of the resin material include thermoplastic resins such as polyamide, polyethylene, ethylene-vinyl alcohol copolymer resin (EVOH), and polyester, and thermosetting resins such as epoxy. The cap 3 is made of a metal material such as aluminum. A member such as a valve is attached to the cap 3. The reinforcing layer 4 is formed, for example, such that fibers impregnated with a thermosetting resin are wound around the outer peripheral surface of the liner 2 by a plurality of turns. The fiber is made of a composite material in which, for example, carbon fiber, glass fiber, or aramid fiber is put in plastic to improve the strength.

The hydrogen tank 1 having such a structure is held by the tank holding device 10 at two points in a direction of an axis L of the hydrogen tank 1. The number of points where the hydrogen tank 1 is held by the tank holding device 10 is not limited to two, and may be, for example, three or more. When the tank holding device 10 and a neck mount member for fixing each cap 3 are used in combination, the hydrogen tank 1 may be held by the tank holding device 10 only at one point.

Tank Holding Device

The tank holding device 10 includes a pair of upper and lower holding members (first holding member 11*a* and second holding member 11*b*), and holds the hydrogen tank 1 by using these holding members. Specifically, the first holding member 11*a* is arranged on the upper half circumference of the hydrogen tank 1, and the second holding member 11*b* is arranged on the lower half circumference of the hydrogen tank 1. In this state, the ends of the first holding member 11*a* and the second holding member 11*b* are fastened to each other by fastening members 30. By tightening the hydrogen tank 1 between the first holding member 11*a* and the second holding member 11*b* in this way, the tank holding device 10 holds the hydrogen tank 1.

The first holding member 11*a* and the second holding member 11*b* have the same structure. Each of the first holding member 11*a* and the second holding member 11*b* includes a band 13 and reinforcing plates 12 arranged at both ends of the band 13.

As shown in FIG. 1, the reinforcing plate 12 is, for example, a metal plate having a predetermined width. The width of the reinforcing plate 12 is substantially equal to the width of the band 13. As shown in FIGS. 3 and 4, the reinforcing plate 12 overlaps the end of the band 13 to press the end of the band 13 from an outer side of the band 13 (upper or lower side of the band 13 in FIGS. 3 and 4). An end 12*c* of the reinforcing plate 12 closer to the hydrogen tank 1 has an arc shape to warp outward in conformity with the curved shape of the band 13. Thus, it is possible to attain an effect of suppressing interference of the end 12*c* of the reinforcing plate 12 with the band 13 to prevent the end 12*c* from damaging the band 13.

As shown in FIG. 4, the reinforcing plate 12 has a relatively small through hole 12*a* and a relatively large through hole 12*b*. The fastening member 30 for fastening the first holding member 11*a* and the second holding member 11*b* is inserted through the through hole 12*a*. The fastening member 30 includes, for example, a bolt and a nut. A bolt 6 for fixing the tank holding device 10 to, for example, a vehicle body structural member 5 is inserted through the through hole 12*b*. The through hole 12*b* is positioned closer to the hydrogen tank 1 as compared with the through hole 12*a*. Examples of the vehicle body structural member 5 include a side member and a floor panel of the fuel cell electric vehicle.

The band 13 is a member for tightening the hydrogen tank 1. The band 13 has a leaf spring structure to hold the hydrogen tank 1 and to follow expansion and contraction of the hydrogen tank 1 (in particular, expansion and contraction in a radial direction of the hydrogen tank 1). The band 13 includes a band-shaped base portion 14 and a plurality of pressing portions 15 projecting from both sides of the base portion 14 (right and left sides of the base portion 14 in FIG. 1) in a width direction of the base portion 14. The width direction of the base portion 14 is a direction orthogonal to a longitudinal direction of the base portion 14.

The base portion 14 extends along the outer circumference of the hydrogen tank 1. The base portion 14 includes wide portions in which the width of the base portion 14 is relatively large, and a narrow portion in which the width of the base portion 14 is relatively small. The wide portion is positioned at each end of the base portion 14 in the longitudinal direction and overlaps the reinforcing plate 12. The narrow portion is positioned between the wide portions and extends along the outer peripheral surface of the hydrogen tank 1 when the band 13 holds the hydrogen tank 1. Although illustration is omitted, the wide portion of the base portion 14 has through holes extending through the wide portion at positions mated with the through holes 12*a* and 12*b* of the reinforcing plate 12, respectively.

Figure 5:
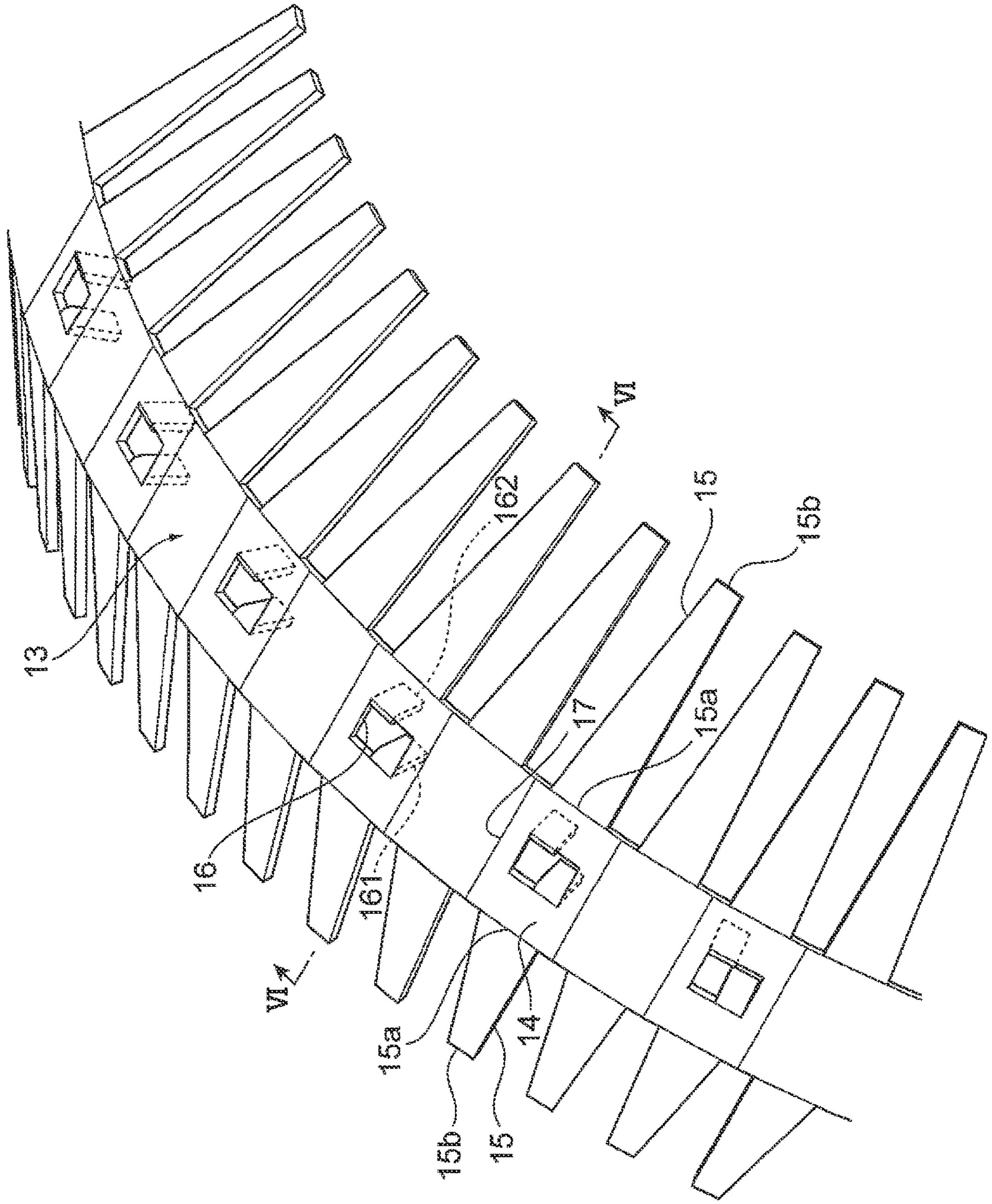
FIG. 5 is a partial perspective view showing a band.
Figure 6:
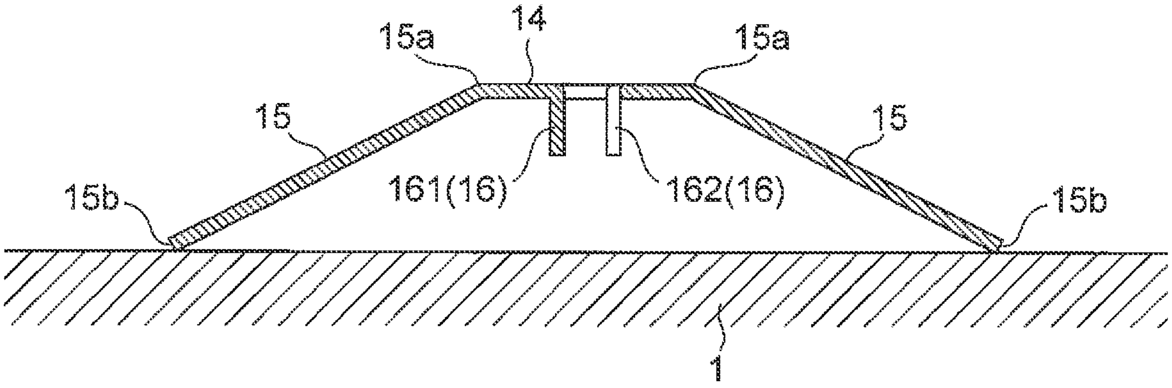
FIG. 6 is a sectional view taken along a line VI-VI in FIG. 5.

FIG. 5 is a partial perspective view showing the band. FIG. 6 is a sectional view taken along a line VI-VI in FIG. 5. FIG. 5 shows the plurality of pressing portions 15. The pressing portions 15 extend from the narrow portion of the base portion 14 to the right and left sides. These pressing portions 15 are bilaterally symmetrical across the base portion 14 and are arranged at equal intervals in the longitudinal direction of the base portion 14. The pressing portion 15 can apply a pressing force to the outer peripheral surface of the hydrogen tank 1 by elastically deforming in abutment against the outer peripheral surface of the hydrogen tank 1.

Specifically, the pressing portions 15 arranged on the right and left sides of the base portion 14 are bent obliquely downward from the base portion 14 (that is, toward the hydrogen tank 1). As shown in FIGS. 5 and 6, the pressing portion 15 positioned on the left side of the base portion 14 is bent obliquely downward to the left, and the pressing portion 15 positioned on the right side of the base portion 14 is bent obliquely downward to the right. A pair of right and left pressing portions 15 and a part of the base portion 14 that couples the right and left pressing portions 15 constitute one leaf spring.

The pressing portion 15 has the same thickness as that of the base portion 14. The pressing portion 15 is formed so that the width gradually decreases from a root portion 15*a* toward a tip portion 15*b*. The root portion 15*a* is coupled to the base portion 14. The tip portion 15*b* includes a free end. The band 13 is formed by, for example, punching a single stainless steel sheet into a shape including the base portion 14 and the pressing portions 15 and then bending the band 13 at predetermined positions. The material used for the band 13 is not limited to the stainless steel, and may be another metal material excellent in strength and elastic deformation.

As shown in FIG. 5, the base portion 14 includes a plurality of ridge portions 17. These ridge portions 17 are provided to further fit the band 13 to the outer peripheral surface of the hydrogen tank 1. The ridge portions 17 are formed by bending the base portion 14 little by little at predetermined intervals in conformity with the curvature of the outer peripheral surface of the hydrogen tank 1. Assuming that the right and left pressing portions 15 and the part of the base portion 14 that couples the right and left pressing portions 15 constitute one leaf spring, each ridge portion 17 is formed between adjacent leaf springs.

When the hydrogen tank 1 is tightened by using the band 13 having such a leaf spring structure, as shown in FIG. 6, the tip portion 15*b* of each pressing portion 15 abuts against the outer peripheral surface of the hydrogen tank 1, and the base portion 14 floats above the outer peripheral surface of the hydrogen tank 1. That is, the tip portion 15*b* of the pressing portion 15 comes into contact with the outer peripheral surface of the hydrogen tank 1. Since the base portion 14 is supported by the pressing portions 15, the base portion 14 floats above the outer peripheral surface of the hydrogen tank 1 without coming into contact with the outer peripheral surface of the hydrogen tank 1.

When the first holding member 11*a* and the second holding member 11*b* are tightened by the fastening members 30, the band 13 having the leaf spring structure is elastically deformed. As a result, the pressing portions 15 apply pressing forces to the outer peripheral surface of the hydrogen tank 1. When the band 13 is elastically deformed, the elastic deformation of each pressing portion 15 is larger than that of the base portion 14.

For example, when a protrusion on a road surface where the vehicle travels interferes with the vehicle to generate a large vibration or a large impact is input to the vehicle in the state described above, a large stress may be applied to the band 13 having the leaf spring structure. When the pressing portion 15 of the band 13 is excessively deformed due to the stress, the deformation of the leaf spring may exceeds an elastic region and reaches a plastic region. To prevent the above deformation of the leaf spring, the band 13 of the present embodiment further includes a plurality of deformation limiting portions 16 that limits the deformation of the pressing portions 15 to a specified amount.

As shown in FIGS. 5 and 6, the deformation limiting portion 16 is formed by projecting a part of the band 13 toward the hydrogen tank 1. Specifically, the deformation limiting portion 16 includes cut-up pieces obtained by bending a part of the base portion 14 substantially vertically toward the hydrogen tank 1. The cut-up pieces are, for example, paired on the right and left (right cut-up piece 162 and left cut-up piece 161). The right cut-up piece 162 and the left cut-up piece 161 are offset so as not to face each other. The length of the deformation limiting portion 16 (in other words, the length of each of the right cut-up piece 162 and the left cut-up piece 161) is set to limit the deformation of the pressing portion 15 to the specified amount. The length of the deformation limiting portion 16 may be set to use the pressing portion 15 in the elastic region.

Assuming that the right and left pressing portions 15 and the part of the base portion 14 that couples the right and left pressing portions 15 constitute one leaf spring, the deformation limiting portions 16 are formed on every other leaf spring along an arrangement direction of the leaf springs (that is, the longitudinal direction of the base portion 14). That is, as shown in FIG. 5, the deformation limiting portions 16 are formed on every other leaf spring so that the deformation limiting portions 16 are not present on both the adjacent leaf springs. The deformation limiting portions 16 may be formed on every third leaf spring along the arrangement direction of the leaf springs. The deformation limiting portion 16 may be formed on each leaf spring.

Figure 7:
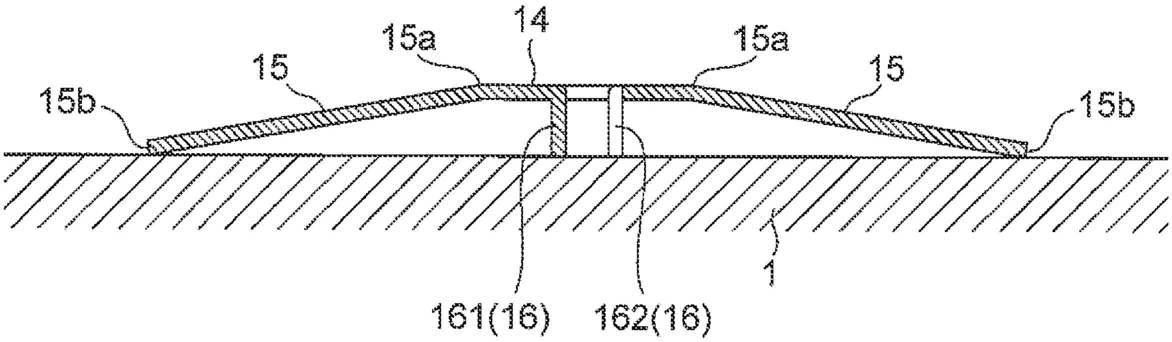
FIG. 7 is a sectional view for explaining a function of a deformation limiting portion.

In the tank holding device 10 structured as described above, the band 13 includes the deformation limiting portions 16 that limit the deformation of the pressing portions 15 to the specified amount. Therefore, even if a large stress is applied to the band 13 due to vibration, impact, or the like, the deformation limiting portion 16 abuts against the outer peripheral surface of the hydrogen tank 1 as shown in FIG. 7 to limit the deformation of the pressing portions 15 to the specified amount. As a result, it is possible to prevent irreversible deformation of the band 13. Since the deformation limiting portion 16 is formed by projecting a part of the base portion 14 toward the hydrogen tank 1, the deformation limiting portion 16 can be formed without increasing the number of components. As a result, it is possible to suppress an increase in cost along with the formation of the deformation limiting portion 16. Since the length of the deformation limiting portion 16 is set to use the pressing portion 15 in the elastic region, the irreversible deformation of the band 13 can be prevented more reliably.

Figure 8:
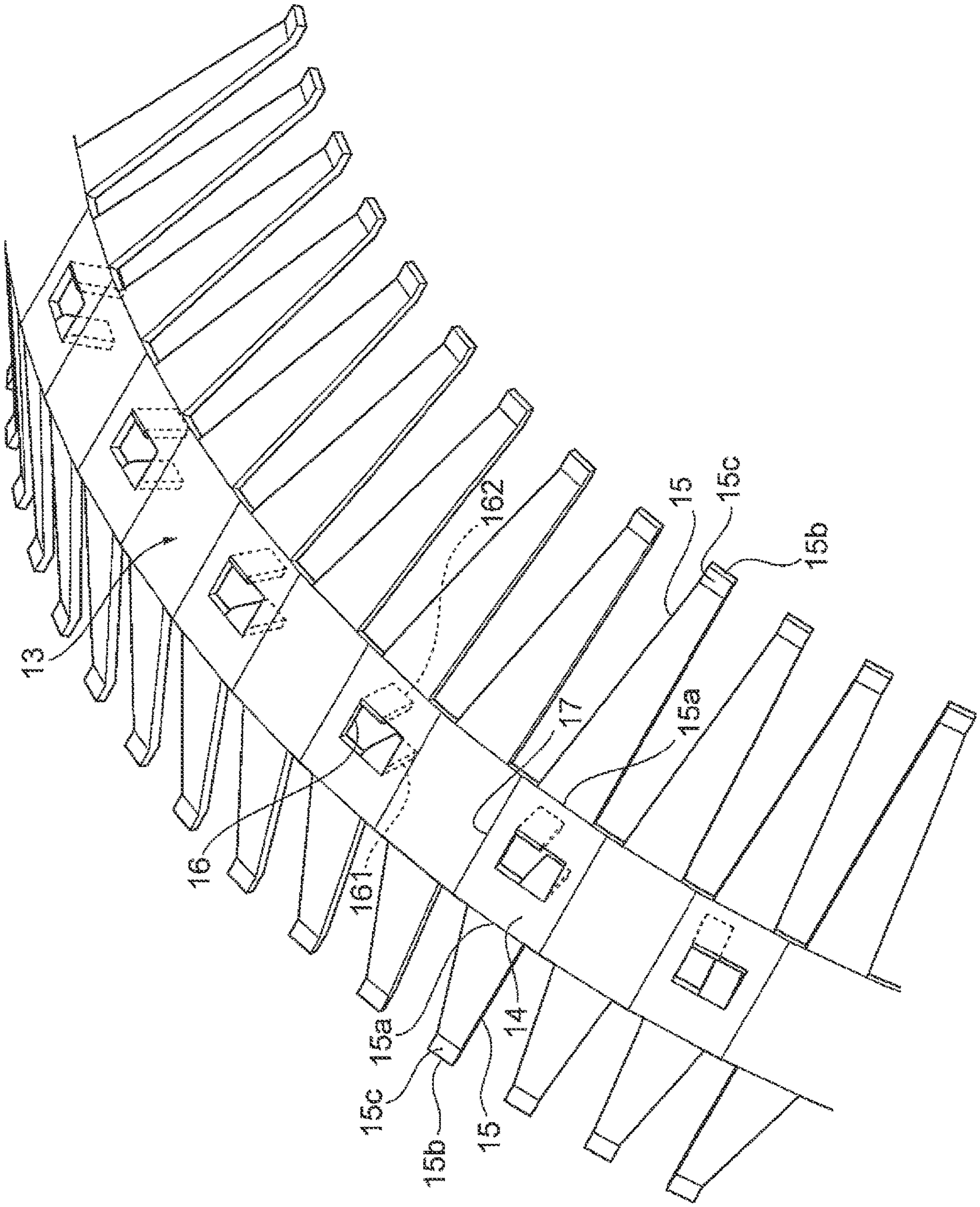
FIG. 8 is a partial perspective view showing a modification of the band.

In this embodiment, a part of the tip portion 15*b* of each pressing portion 15 may include, for example, a tab 15*c* parallel to the outer peripheral surface of the hydrogen tank 1 as shown in FIG. 8. By forming the tab 15*c* parallel to the outer peripheral surface of the hydrogen tank 1 in this way, a large abutment area can be secured between the pressing portion 15 and the outer peripheral surface of the hydrogen tank 1. As a result, the effect of suppressing the damage to the outer peripheral surface of the hydrogen tank 1 due to the pressing portion 15 can be expected.

The deformation limiting portion is not limited to those described above, and various modifications may be conceivable.

Modification 1

Figure 9:
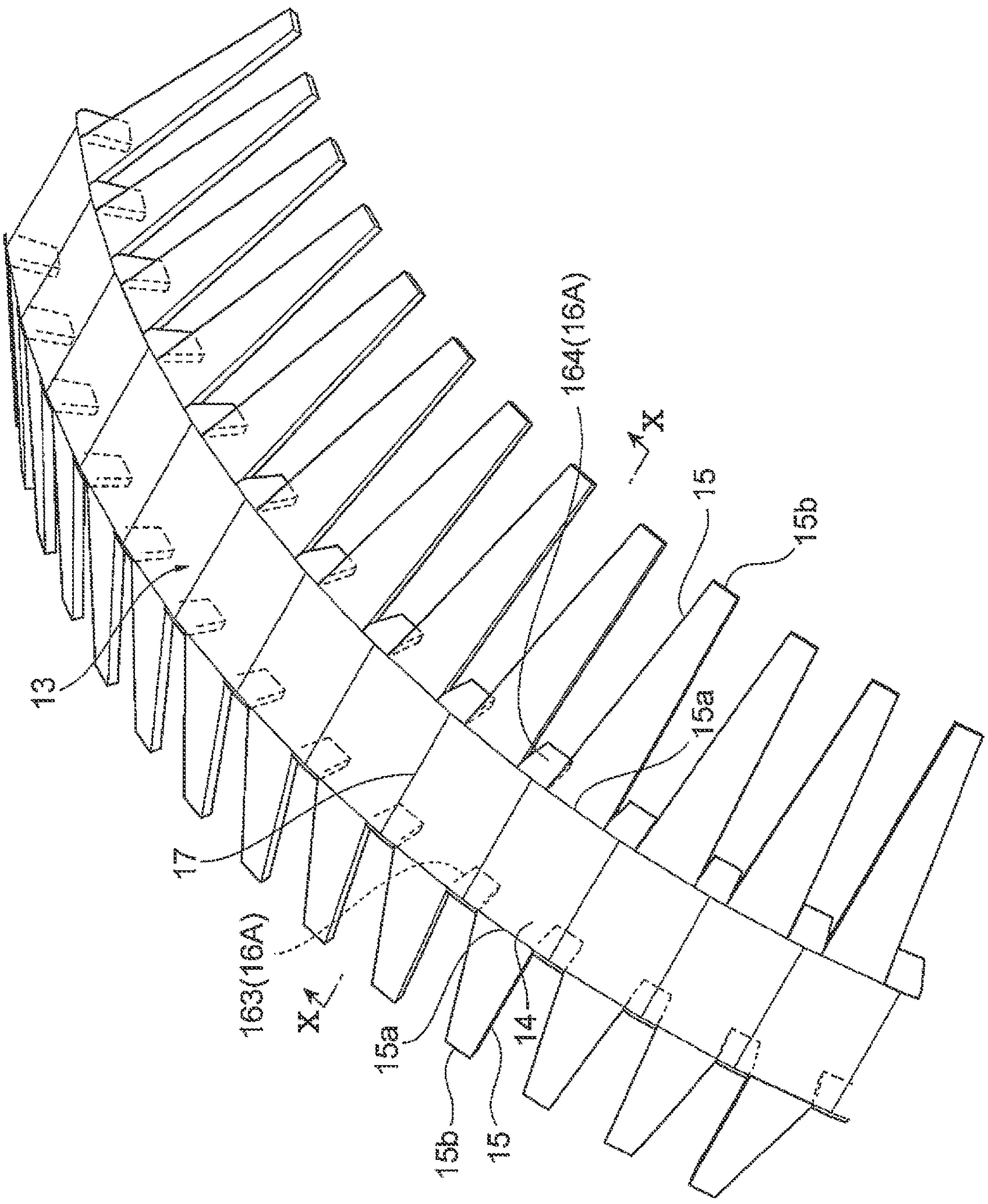
FIG. 9 is a partial perspective view showing Modification 1 of the deformation limiting portion.
Figure 10:
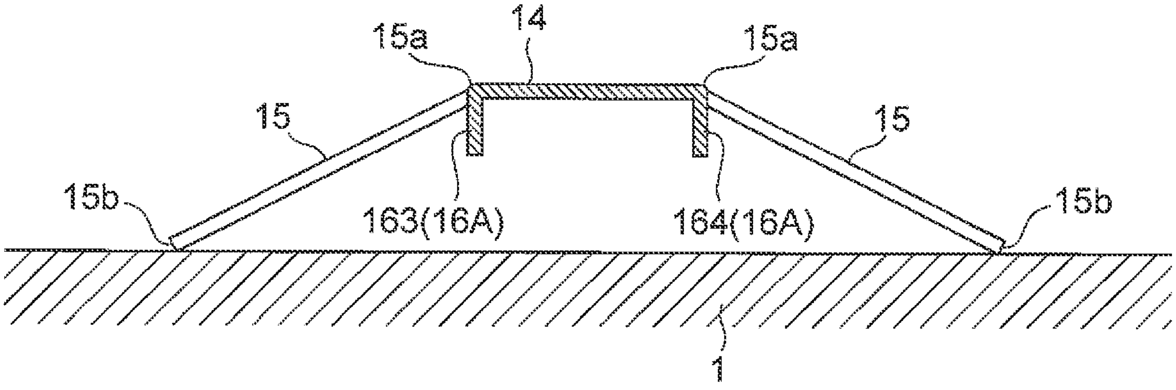
FIG. 10 is a sectional view taken along a line X-X in FIG. 9.

For example, as shown in FIGS. 9 and 10, each deformation limiting portion 16A includes projecting pieces provided between leaf springs adjacent to each other in the longitudinal direction of the band 13. The projecting pieces are, for example, paired on the right and left (right projecting piece 164 and left projecting piece 163), and project toward the hydrogen tank 1. The right projecting piece 164 and the left projecting piece 163 face each other across the base portion 14. The deformation limiting portion 16A is formed over a part including the ridge portion 17. The bending angle of the ridge portion 17 is small. Therefore, influence of the ridge portion 17 on the formation of the deformation limiting portion 16A is negligibly small. The deformation limiting portion 16A includes the right and left portions in pairs so as to be bilaterally symmetrical across the base portion 14, but is not limited to this structure. The deformation limiting portions 16A may be formed in a staggered pattern along the longitudinal direction of the band 13.

According to the deformation limiting portion 16A structured as described above, the same actions and effects as those in the embodiment described above can be attained. Further, a decrease in the strength of the base portion 14 due to the formation of the cut-up pieces can be prevented as compared with the deformation limiting portion 16 including the cut-up pieces. Thus, the strength of the base portion 14 can be secured easily.

Modification 2

Figure 11:
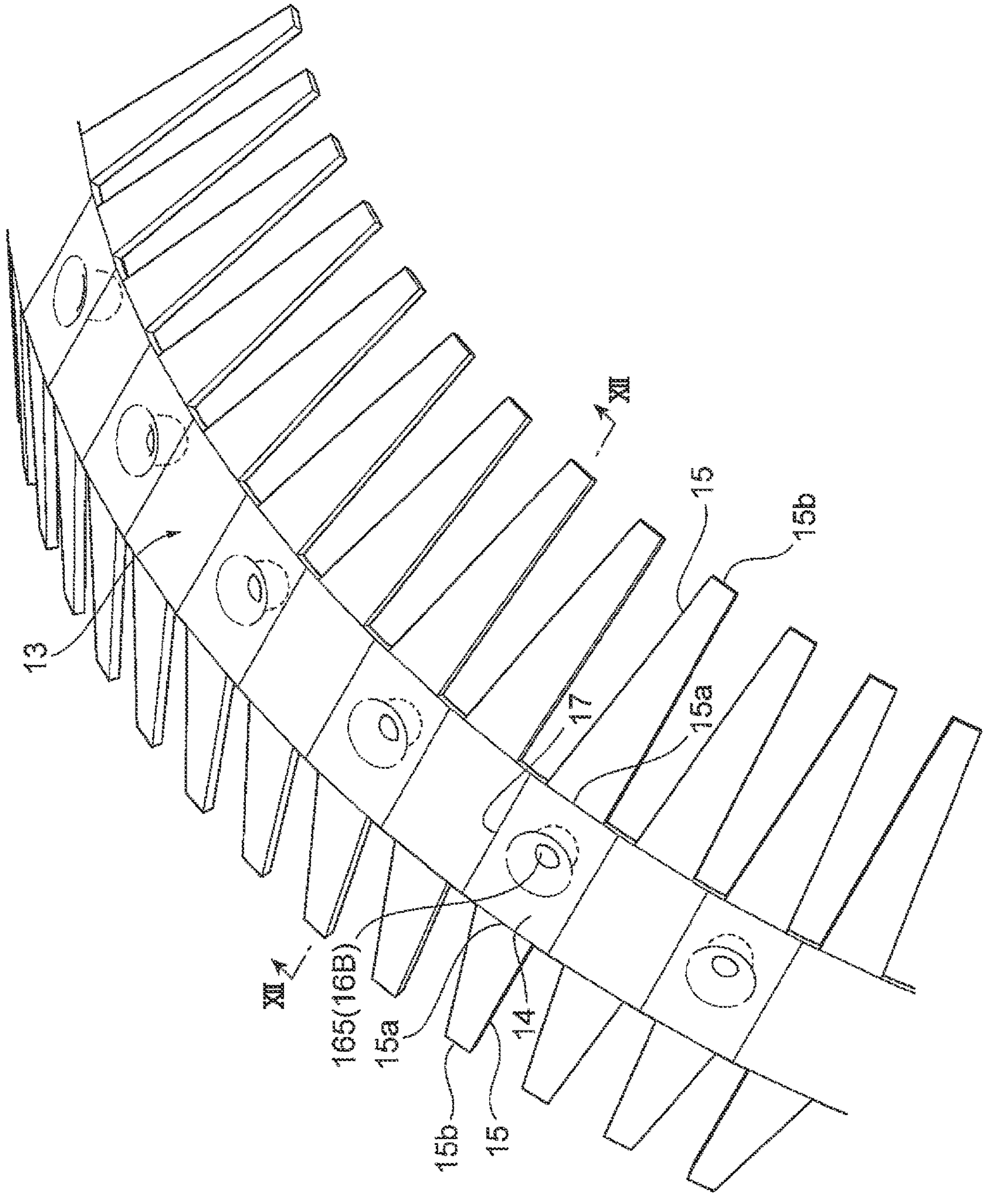
FIG. 11 is a partial perspective view showing Modification 2 of the deformation limiting portion.
Figure 12:
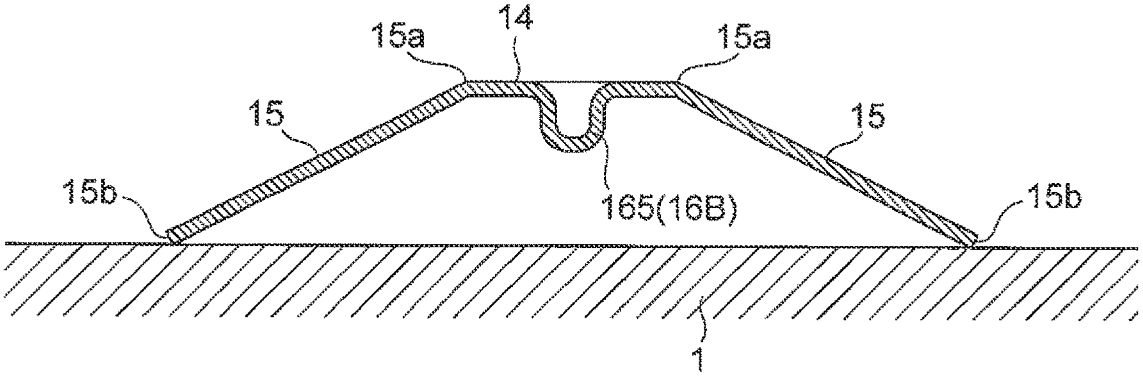
FIG. 12 is a sectional view taken along a line XII-XII in FIG. 11.

As shown in FIGS. 11 and 12, each deformation limiting portion 16B includes a dome-shaped raised portion 165 projecting toward the hydrogen tank 1. The raised portion 165 is formed, for example, by drawing a part of the base portion 14. The raised portions 165 are formed on every other leaf spring in the arrangement direction of the leaf springs. The raised portions 165 may be formed on every third leaf spring in the arrangement direction of the leaf springs. The raised portion 165 may be formed on each leaf spring.

According to the deformation limiting portion 16B structured as described above, the same actions and effects as those in the embodiment described above can be attained. Further, a decrease in the strength of the base portion 14 due to the formation of the cut-up pieces can be prevented as compared with the deformation limiting portion 16 including the cut-up pieces. Thus, the strength of the base portion 14 can be secured easily.

Modification 3

Figure 13:
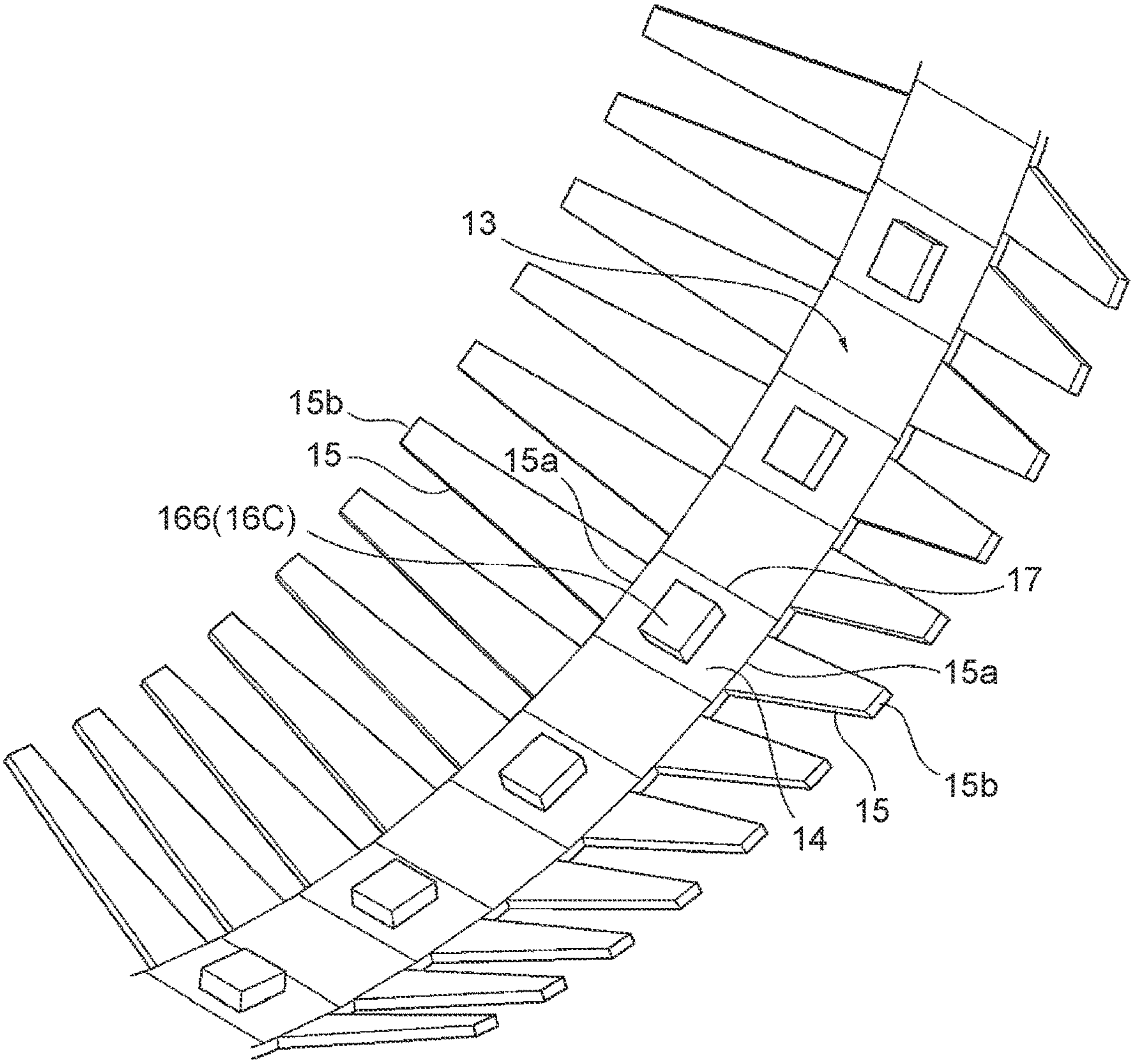
FIG. 13 is a partial perspective view showing Modification 3 of the deformation limiting portion.

As shown in FIG. 13, each deformation limiting portion 16C is formed by attaching a block-shaped stopper member 166 to the inner surface of the base portion 14 (that is, the surface of the base portion 14 closer to the hydrogen tank 1). FIG. 13 is a partial perspective view from the inner side of the base portion 14 (that is, from the hydrogen tank 1). The stopper member 166 is made of a metal material or a hard resin material having a predetermined thickness, and is manufactured separately from the base portion 14. The thickness of the stopper member 166 is set to use the pressing portion 15 in the elastic region.

When the stopper member 166 is made of a hard resin material, the stopper member 166 may be attached to the base portion 14 by bonding or the like. When the stopper member 166 is made of a metal material, the stopper member 166 may be attached to the base portion 14 by bonding, welding, clinching, or the like. The stopper members 166 are formed on every other leaf spring in the arrangement direction of the leaf springs, but may be formed on every third leaf spring. The stopper member 166 may be formed on each leaf spring.

According to the deformation limiting portion 16C structured as described above, the same actions and effects as those in the embodiment described above can be attained. In addition to these effects, it is possible to attain such an effect that the deformation limiting portion 16C can easily be formed as compared with the deformation limiting portion including the cut-up pieces, the projecting pieces, or the raised portion. The deformation limiting portion 16C is formed by attaching, to the base portion 14, the stopper member 166 manufactured separately from the base portion 14. For this reason, it is not necessary to process the band 13 to form, for example, the cut-up piece, the projecting piece, or the raised portion.

Modification 4

Figure 14:
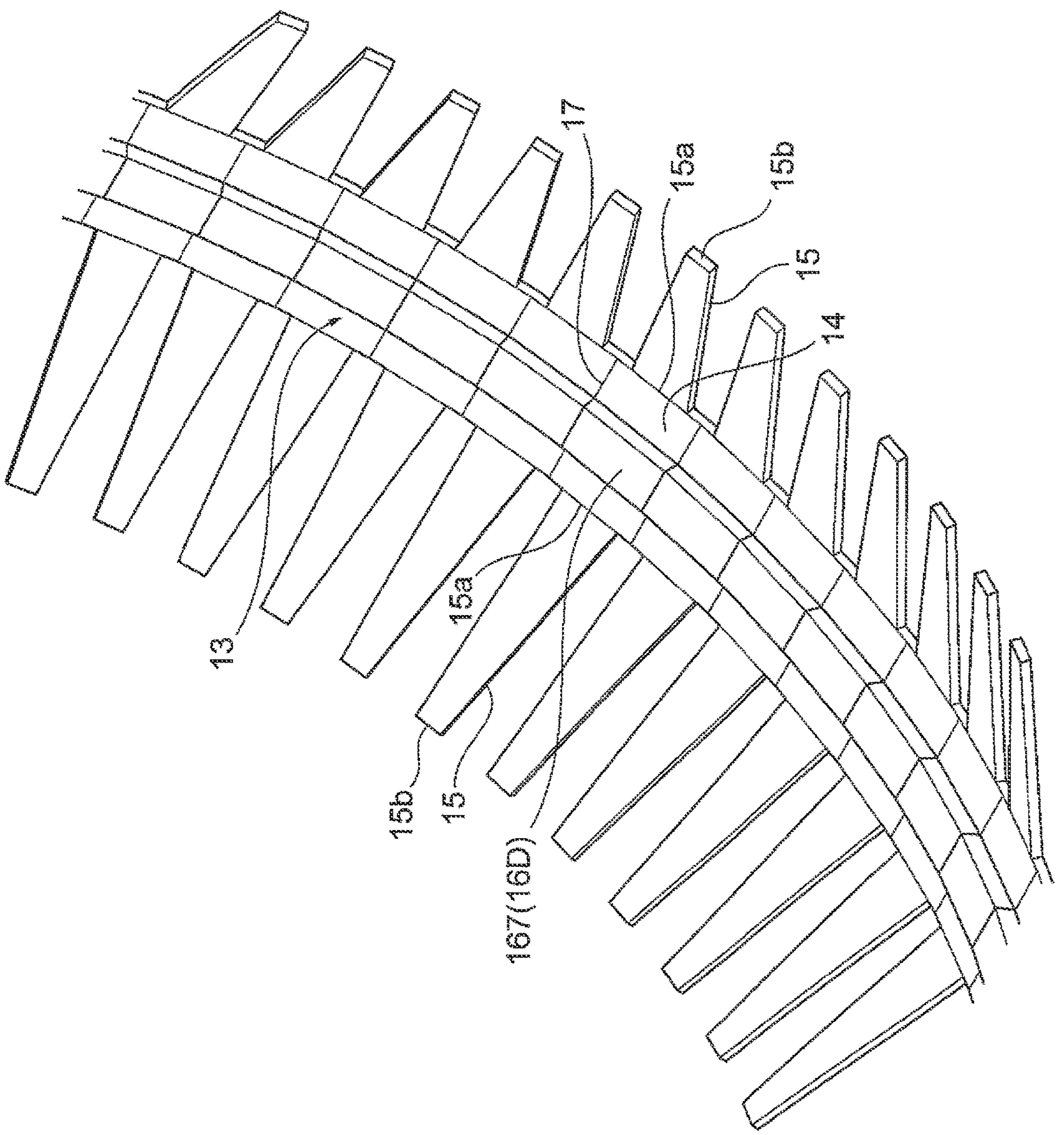
FIG. 14 is a partial perspective view showing Modification 4 of the deformation limiting portion.

As shown in FIG. 14, a deformation limiting portion 16D is formed by attaching an elongated stopper member 167 to the inner surface of the base portion 14. FIG. 14 is a partial perspective view from the inner side of the base portion 14 (that is, from the hydrogen tank 1). The stopper member 167 is made of a metal material or a hard resin material having a predetermined thickness, and is manufactured separately from the base portion 14. The elongated stopper member 167 is bent at the formation positions of the ridge portions 17. The thickness of the stopper member 167 is set to use the pressing portion 15 in the elastic region. When the stopper member 167 is made of a hard resin material, the stopper member 167 may be attached to the base portion 14 by bonding or the like. When the stopper member 167 is made of a metal material, the stopper member 167 may be attached to the base portion 14 by bonding, welding, clinching, or the like.

According to the deformation limiting portion 16D structured as described above, the same actions and effects as those in the embodiment described above can be attained. In addition to these effects, it is possible to attain such an effect that the deformation limiting portion 16D can easily be formed as compared with the deformation limiting portion including the cut-up pieces, the projecting pieces, or the raised portion. The deformation limiting portion 16D is formed by attaching, to the base portion 14, the stopper member 167 manufactured separately from the base portion 14. For this reason, it is not necessary to process the band 13 to form, for example, the cut-up piece, the projecting piece, or the raised portion.

While the embodiment of the present disclosure has been discussed in detail above, the present disclosure is not limited to the embodiment discussed above, and a variety of design changes can be made without departing from the scope of the present disclosure.

What is claimed is:

1. A tank holding device comprising a band configured to tighten a tank, wherein the band includes:

a band-shaped base portion extending along an outer circumference of the tank;

a plurality of pressing portions projecting from both sides of the base portion in a width direction orthogonal to a longitudinal direction of the base portion and configured to apply a pressing force to an outer peripheral surface of the tank by elastically deforming in abutment against the outer peripheral surface of the tank; and a deformation limiting portion configured to limit deformation of the pressing portions to a specified amount.

2. The tank holding device according to claim 1, wherein the deformation limiting portion is provided on the base portion, and a length of the deformation limiting portion in a direction from the base portion toward the outer peripheral surface of the tank is set to limit the deformation of the pressing portions to the specified amount by abutment of the deformation limiting portion against the outer peripheral surface of the tank.

3. The tank holding device according to claim 1, wherein the specified amount is set to use the pressing portions in an elastic region.

4. The tank holding device according to claim 1, wherein the pressing portion includes a tip portion at a distal end in a direction in which the pressing portion projects from the base portion, and a part of the tip portion includes a tab parallel to the outer peripheral surface of the tank.

5. The tank holding device according to claim 1, wherein the deformation limiting portion is a part of the band that projects toward the tank.

6. The tank holding device according to claim 5, wherein the deformation limiting portion includes a cut-up piece that is a part of the base portion bent toward the tank.

7. The tank holding device according to claim 5, wherein the deformation limiting portion includes a projecting piece projecting toward the tank from an end of the base portion in the width direction, and the projecting piece is arranged between the pressing portions adjacent to each other in the longitudinal direction of the base portion.

8. The tank holding device according to claim 5, wherein the deformation limiting portion includes a dome-shaped raised portion in which a surface of the base portion facing the tank projects toward the tank.

9. The tank holding device according to claim 1, wherein the deformation limiting portion is a stopper member attached to the base portion.

10. The tank holding device according to claim 9, wherein the stopper member has a block shape and is fixed to a surface of the base portion facing the tank.

11. The tank holding device according to claim 9, wherein the stopper member is elongated to extend along the longitudinal direction of the base portion and is fixed to a surface of the base portion facing the tank.

* * * * *